United States Patent
Kowada et al.

(10) Patent No.: US 9,650,938 B2
(45) Date of Patent: May 16, 2017

(54) EXHAUST EMISSION CONTROL DEVICE

(75) Inventors: Minoru Kowada, Tokyo (JP); Toshiaki Kuroki, Tokyo (JP); Ryoji Suzuki, Tokyo (JP); Hiroshi Uchigata, Fujisawa (JP); Toshiyuki Yamada, Fujisawa (JP)

(73) Assignees: HINO MOTORS, LTD., Tokyo (JP); ISUZU MOTORS LIMITED, Tokyo (JP)

( * ) Notice: Subject to any disclaimer, the term of this patent is extended or adjusted under 35 U.S.C. 154(b) by 181 days.

(21) Appl. No.: 13/581,689

(22) PCT Filed: Mar. 16, 2011

(86) PCT No.: PCT/JP2011/001530
§ 371 (c)(1),
(2), (4) Date: Aug. 29, 2012

(87) PCT Pub. No.: WO2011/114721
PCT Pub. Date: Sep. 22, 2011

(65) Prior Publication Data
US 2012/0328479 A1 Dec. 27, 2012

(30) Foreign Application Priority Data

Mar. 19, 2010 (JP) ................... 2010-064665

(51) Int. Cl.
*B01D 50/00* (2006.01)
*F01N 13/16* (2010.01)
(Continued)

(52) U.S. Cl.
CPC ............ *F01N 13/16* (2013.01); *F01N 3/2066* (2013.01); *F01N 3/28* (2013.01); *F01N 13/08* (2013.01);
(Continued)

(58) Field of Classification Search
CPC .................. F01N 13/16; F01N 3/2066; F01N 2610/1453; Y02T 10/24
(Continued)

(56) References Cited

U.S. PATENT DOCUMENTS 8,261,537 B2 * 9/2012 Osbat .................... F01N 3/2066
137/338
2006/0156712 A1 * 7/2006 Buhmann ............. F01N 3/0335
60/297
(Continued)

FOREIGN PATENT DOCUMENTS

| JP | 2003-010644 A | 1/2003 |
|---|---|---|
| JP | 2005 273614 | 10/2005 |

(Continued)

OTHER PUBLICATIONS

International Search Report Issued Jun. 14, 2011 in PCT/JP11/01530 Filed Mar. 16, 2011.

*Primary Examiner* — Tom P Duong
(74) *Attorney, Agent, or Firm* — Oblon, McClelland, Maier & Neustadt, L.L.P.

(57) ABSTRACT

Arranged are a selective reduction catalyst for reacting $NO_x$ in exhaust gas 2 with ammonia, an exhaust passage 5 for guiding the exhaust gas 2 to the selective reduction catalyst, and a urea water addition unit 4 incorporated in the exhaust passage 5 for adding urea water 3 into the exhaust gas 2. A portion of the exhaust passage 5 adjacent to an added position of the urea water 3 is constituted by a divisional piece 5a made of material having higher corrosive resistance to a substance produced by addition of the urea water 3 than that of a material constituting the remaining portion of the exhaust passage 5 other than the adjacent portion.

4 Claims, 5 Drawing Sheets

(51) Int. Cl.
*F01N 3/20* (2006.01)
*F01N 13/08* (2010.01)
*F01N 3/28* (2006.01)
*F01N 13/18* (2010.01)

(52) U.S. Cl.
CPC ...... *F01N 13/1805* (2013.01); *F01N 2610/02* (2013.01); *F01N 2610/1453* (2013.01); *Y02T 10/24* (2013.01)

(58) Field of Classification Search
USPC .......... 422/177, 182, 183, 169, 180; 60/286, 60/299
See application file for complete search history.

(56) References Cited

U.S. PATENT DOCUMENTS

| | | |
|---|---|---|
| 2008/0022670 A1 | 1/2008 | Ichikawa |
| 2008/0092531 A1* | 4/2008 | Suzuki et al. .................. 60/301 |
| 2009/0092525 A1* | 4/2009 | Ichikawa ............... B01D 53/90 422/177 |
| 2009/0100827 A1 | 4/2009 | Suzuki et al. |
| 2009/0158720 A1* | 6/2009 | Krause ................... F01N 1/084 60/297 |
| 2010/0043400 A1* | 2/2010 | Wang .................... F01N 3/2066 60/276 |
| 2010/0061898 A1* | 3/2010 | Lehnen et al. ................ 422/168 |
| 2010/0146948 A1* | 6/2010 | DaCosta et al. ................ 60/295 |
| 2010/0313553 A1* | 12/2010 | Cavanagh et al. .............. 60/310 |
| 2011/0214415 A1* | 9/2011 | Thomas .......................... 60/297 |

FOREIGN PATENT DOCUMENTS

| | | |
|---|---|---|
| JP | 2006 144576 | 6/2006 |
| JP | 2009 97436 | 5/2009 |
| JP | 2009-108787 A | 5/2009 |
| JP | 2009 167965 | 7/2009 |

* cited by examiner

EXHAUST EMISSION CONTROL DEVICE

TECHNICAL FIELD

The present invention relates to an exhaust emission control device.

BACKGROUND ART

Conventionally, some diesel engines have a selective reduction catalyst incorporated in an exhaust pipe through which exhaust gas flows, said catalyst having a feature of selectively reacting $NO_x$ with a reducing agent even in the presence of oxygen. A required amount of reducing agent is added upstream of the selective reduction catalyst and is reacted on the catalyst with $NO_x$ (nitrogen oxides) in the exhaust gas to thereby reduce a concentration of $NO_x$ to be discharged.

It has been well known in a field of flue-gas denitration in industrial plant or the like that ammonia ($NH_3$) is effectively used as reducing agent to depurate $NO_x$ through reduction. However, it is difficult for automobiles to ensure safety in driving with ammonia itself carried, so that use of nontoxic urea water as reducing agent has been recently researched (see, for example, Patent Literature 1).

More specifically, when urea water is added to the exhaust gas upstream of the selective reduction catalyst, the urea water is decomposed into ammonia and carbon dioxide gas according to the following equation to thereby depurate $NO_x$ in the exhaust gas well through reduction by ammonia on the catalyst.

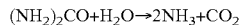

$$(NH_2)_2CO+H_2O \rightarrow 2NH_3+CO_2$$

As shown in FIG. 1, known as the prior art for addition of urea water 3 into exhaust gas 2 upstream of a selective reduction catalyst 1 is a nozzle 4a of a urea water addition unit 4 inserted near an axis of an exhaust passage 5 so as to add the urea water 3 centrally of a flow of the exhaust gas 2, which brings about the nozzle 4a of the addition unit 4 to be directly subjected to the flow of the high-temperature exhaust gas 2, leading to anxiety about a durability of the addition unit 4.

In order to overcome this, as shown in FIG. 2, it has been under review that an injection port 6 slantingly divergent upstream is provided on a side surface of the exhaust passage 5, the urea water addition unit 4 being fitted to the injection port 6 from outside of the exhaust passage 5 to front an inside of the exhaust passage 5, the urea water 3 being added by the addition unit 4 which is protected not to be directly subjected to the flow of the high-temperature exhaust gas 2.

CITATION LIST

Patent Literature

[Patent Literature 1] JP 2005-273614A

SUMMARY OF INVENTION

Technical Problems

However, if an added amount of the urea water 3 is increased so as to enhance the $NO_x$ depuration performance upon addition of the urea water 3 into the exhaust gas 2 in a manner shown in FIG. 1 or 2, the flow may be formed with attachment (or intervene) of the urea water 3 having not vaporized on an inner periphery of the exhaust passage 5, and a substance produced by a chemical reaction of such urea water 3 may induce rapidly-progressive corrosion. Particularly in the mode as shown in FIG. 2 where the urea water 3 is injected through the injection port 6 formed on the side surface of the exhaust passage 5, the sprayed urea water 3 is susceptible to the flow of the exhaust gas 2 to form a biased flow along the inner periphery of the exhaust passage 5, so that the urea water 3 tends to become hardly vaporized to intervene on the inner periphery of the exhaust passage 5 and induce the corrosion.

In the known urea water addition unit 4 as shown in FIG. 1, the urea water 3 is guided in gas-liquid mixing with air to the nozzle 4a and is added in air-assisted injection. In order to eliminate air piping for cost reduction, the urea water 3 may be injected under pressure with no assist of air instead, which tends to lower an oxygen concentration on a surface of stainless steel constituting the exhaust passage 5 because of the added urea water 3 having no air, resulting in difficulty in passivation on the surface of the stainless steel to lower the corrosive resistance and facilitate the corrosion by the addition of the urea water 3.

When a particulate filter for capture of particles in the exhaust gas 2 is arranged upstream of the selective reduction catalyst 1 through the exhaust passage 5, the added amount of the urea water 3 must be increased in response to increase of $NO_x$ concentration during regeneration of the particulate filter and for cooling of the urea water addition unit 4. Moreover, the combustion of the particulates captured in the particulate filter elevates the exhaust temperature, which activates the chemical reaction of the urea water 3 to accelerate the corrosion velocity, disadvantageously resulting in an accelerated tendency of occurrence of the corrosion.

Conceivable is a countermeasure that the whole of the exhaust passage 5 is changed into that made of highly corrosive resistant material such as material having high chrome concentration. However, highly corrosive resistant material such as material having high chrome concentration is expensive, so that such change of the whole of the exhaust passage 5 brings about substantially steep rise of equipment cost of the exhaust emission control device.

The invention was made in view of the above and has its object to enable prevention of corrosion of the exhaust passage without substantial steep rise of equipment cost.

Solution to Problems

The invention is directed to an exhaust emission control device comprising a selective reduction catalyst for reacting $NO_x$ in an exhaust gas with ammonia, an exhaust passage for guiding the exhaust gas to said selective reduction catalyst and urea water addition means incorporated in said exhaust passage for adding urea water into the exhaust gas, characterized in that a portion of said exhaust passage adjacent to an added position of the urea water is made of material having higher corrosion resistance to a substance resulting from the addition of the urea water than that of a material constituting a remaining portion of the exhaust passage other than said adjacent portion.

Thus, in this way, if the added amount of urea water is increased so as to enhance the $NO_x$ depuration performance, and the urea water having not vaporized is attached on the inner periphery of the exhaust passage, the rapidly-progressive corrosion is prevented from being induced since the portion of the exhaust passage adjacent to the added position of the urea water is made of material having higher corrosive resistance to the substance resulting from the addition of the urea water than that of material constituting the reminding portion of the exhaust passage other than the adjacent portion.

Further, the invention is preferably applied to a structure with an airless injection mode where urea water is injected under pressure by the urea water addition means with no assist by air, which makes it possible to eliminate air piping in the urea water addition means since the urea water is added with no assist by air.

Further, the invention is preferably applied to a structure with a particulate filter for capturing particulates in the exhaust gas being arranged in the exhaust passage upstream of the selective reduction catalyst through the exhaust passage, which makes it possible to reduce not only $NO_x$ but also particulates since the particulates in the exhaust gas are captured upstream of the selective reduction catalyst by the particulate filter.

Further, it is preferable in the invention that the urea water addition means injects the urea water at an injection port formed on a side surface of the exhaust passage, which makes it possible to protect the urea water addition means so as not to be directly exposed to the flow of high-temperature exhaust gas.

Advantageous Effects of Invention

The above-mentioned exhaust emission control device according to the invention can exhibit the following various excellent effects.

(I) The portion of the exhaust passage adjacent to the added position of the urea water is constituted by a highly corrosive-resistant material so as to prevent the corrosion of the exhaust passage due to the addition of the urea water, so that equipment cost can be substantially reduced in comparison with a case where a whole of the exhaust passage is changed into that made of highly corrosive-resistant material such as material having high chrome content.

(II) If and when the urea water addition means employs airless injection mode where the urea water is injected under pressure with no assist by air, air piping can be eliminated for the urea water addition means, resulting in substantial cost reduction.

(III) If and when a particulate filter for capturing the particulates in the exhaust gas is arranged in the exhaust passage upstream of the selective reduction catalyst, not only $NO_x$ bust also particulates can be reduced.

(IV) If and when the urea water addition means is arranged to inject the urea water at an injection port formed on a side surface of the exhaust passage, the urea water addition means can be protected so as not to be directly exposed to the flow of the high-temperature exhaust gas, resulting in substantially improvement in durability of the urea water addition means.

DESCRIPTION OF EMBODIMENTS

Embodiments of the invention will be described with reference to the drawings.

Figure 1:
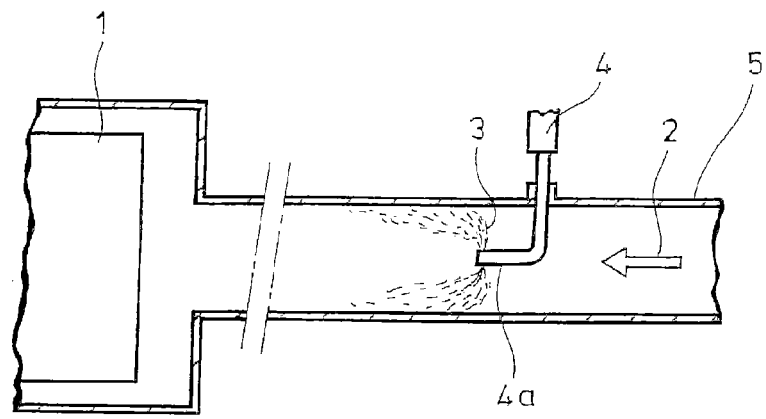
FIG. 1 is a sectional view showing an example of conventional exhaust emission control device.
Figure 2:
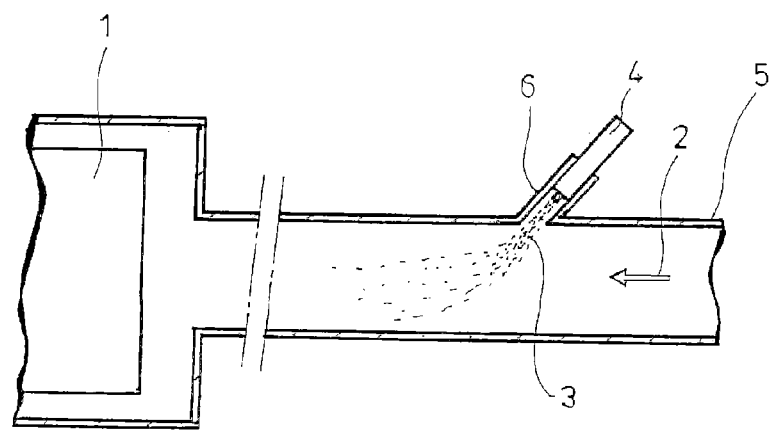
FIG. 2 is a sectional view showing a further example of the conventional exhaust emission control device.
Figure 3:
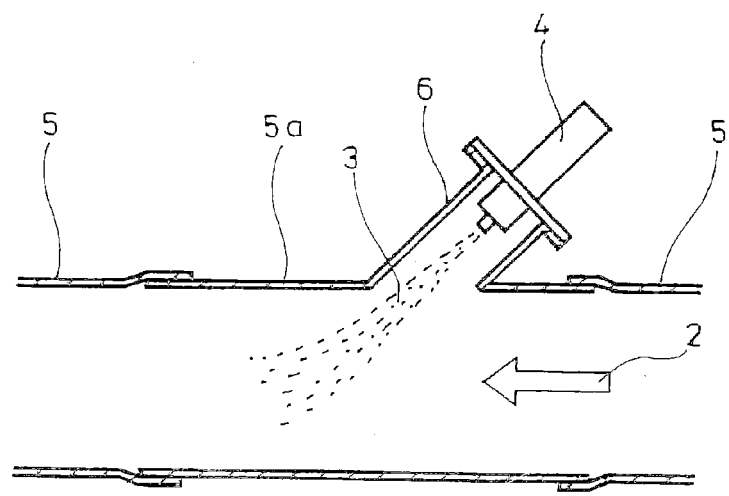
FIG. 3 is a sectional view showing an embodiment of the invention.

FIG. 3 shows an embodiment of the invention in which parts similar to those in FIGS. 1 and 2 are designated by the same reference numerals.

As shown in FIG. 3, in the embodiment, a portion of an exhaust passage 5 adjacent to an added position of a urea water 3 is constituted by a divisional piece 5 made of material having higher corrosion resistance to a substance produced by added urea water 3 than that of a material constituting the reminding portion of the exhaust passage 5. The divisional piece 5a has front and rear ends connected to upstream- and downstream-side exhaust passage 5 through spigot joining, respectively, and has a side surface formed with an injection port 6 slantingly divergent upstream. Fitted to the injection port 6 from outside is the urea water addition unit 4 employing airless injection mode where the urea water 3 is injected under pressure with no assist by air.

Figure 4:
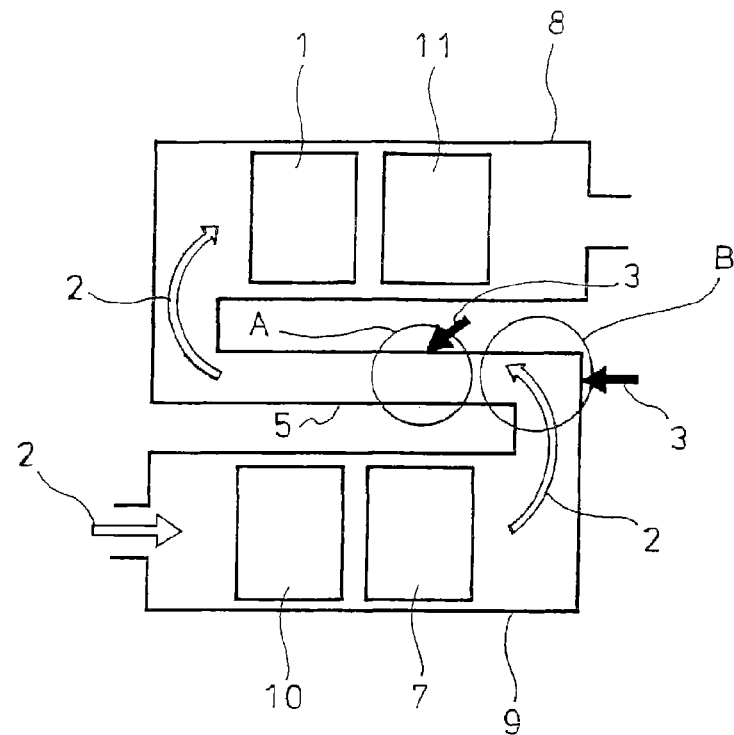
FIG. 4 is a schematic view showing an example of S-shaped exhaust emission control device.

FIG. 4 shows a specific application of the FIG. 3 structure. In the example illustrated, the FIG. 3 structure is applied to a straight portion A of the exhaust passage 5 in an S-shaped exhaust emission control device where the selective reduction catalyst 1 and the particulate filter 7 are encased by casings 8 and 9, respectively, and arranged in parallel with each other, an outlet end of the particulate filter 7 being connected to an inlet end of the selective reduction catalyst 1 through the exhaust passage 5 such that the exhaust gas 2 discharged through the outlet end of the particulate filter 7 is reversely folded back and is introduced into the inlet end of the adjacent selective reduction catalyst 1.

In the embodiment illustrated, arranged upstream of the particulate filter 7 encased by the casing 9 is an oxidation catalyst 10 for oxidation treatment of unburned fuel in the exhaust gas 2; arranged downstream of the selective reduction catalyst 1 encased by the casing 8 is an ammonia reducing catalyst 11 for oxidation treatment of surplus ammonia.

Thus, by this way, when the added amount of the urea water 3 is increased so as to enhance the $NO_x$ depuration performance, any attachment of the urea water 3 having not vaporized on the inner periphery of the exhaust passage 5 is prevented from inducing the rapidly-progressive corrosion here since a portion of the exhaust passage 5 adjacent to the added position of the urea water 3 is constituted by the divisional piece 5a made of material having higher corrosive resistance to a substance produced by addition of the urea water 3 than that of a material constituting the reminding portion of the exhaust passage 5 other than the divisional piece 5a.

Thus, according to the above embodiment, the portion of the exhaust passage 5 adjacent to the added position of the urea water 3 is constituted by the divisional piece 5a made of the material having high corrosive resistance to thereby prevent the exhaust passage 5 from being corroded by addition of the urea water 3, which can bring about substantial reduction in equipment cost in comparison with a case where the whole of exhaust passage 5 is changed into that made of material having high corrosive resistance such as material having high chrome content.

Further, the present embodiment employs the airless injection mode where the urea water 3 is injected under pressure to the urea water addition unit 4 with no assist by air, so that no assist of air is required for the addition of the urea water 3 and air piping for the urea water 3 addition means can be eliminated, thereby attaining substantial cost reduction.

Moreover, the particulate filter 7 is arraigned upstream of the selective reduction catalyst 1 through the exhaust passage 5, so that particulates in the exhaust gas 2 are captured by the particulate filter 7 upstream of the selective reduction catalyst 1, and not only $NO_x$ but also the particulates can be reduced.

Moreover, the urea water addition unit 4 is arranged to inject the urea water 3 at the injection port 6 formed on the side surface of the exhaust passage 5, so that the urea water addition unit 4 can be protected so as not to be directly subjected to the flow of the high-temperature exhaust gas 2, thereby substantially improving the durability of the urea water addition unit 4.

Figure 5:
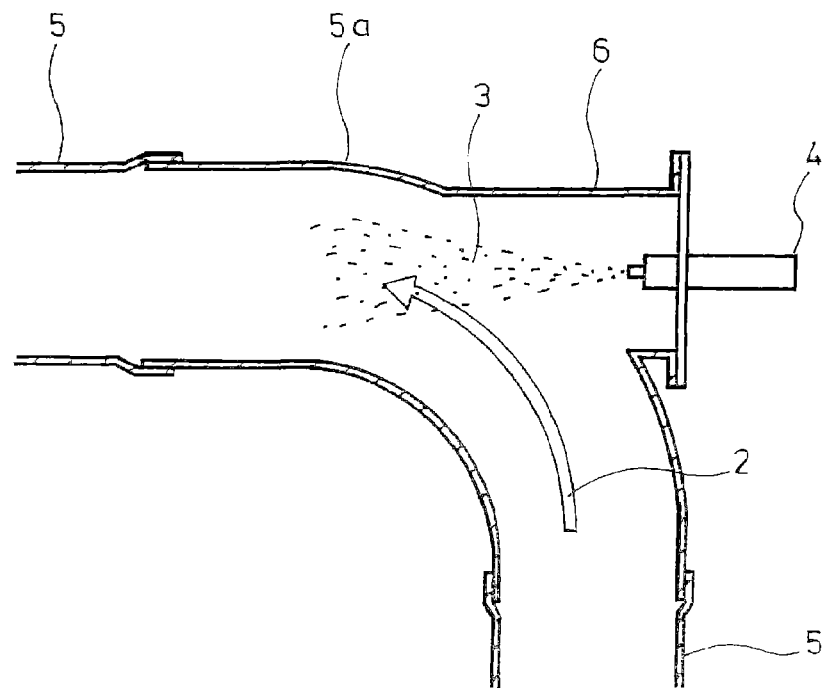
FIG. 5 is a sectional view showing a further embodiment of the invention.

The description has been made on the addition of the urea water 3 midway of the straight portion A of the exhaust passage 5 in the S-shaped exhaust emission control device shown in FIG. 4; when the urea water 3 is to be added at a corner B in the exhaust passage 5 in the S-shaped exhaust emission control device shown in FIG. 4, the divisional piece 5a may be used which is bended in the form of elbow as shown in FIG. 5, the injection port 6 may be formed midway of the divisional piece 5a along an axis of the downstream exhaust passage 5 and projected in a direction away from the downstream exhaust passage 5, the urea water addition unit 4 being fitted to the injection port 6 from outside of the exhaust passage 5.

Figure 6:
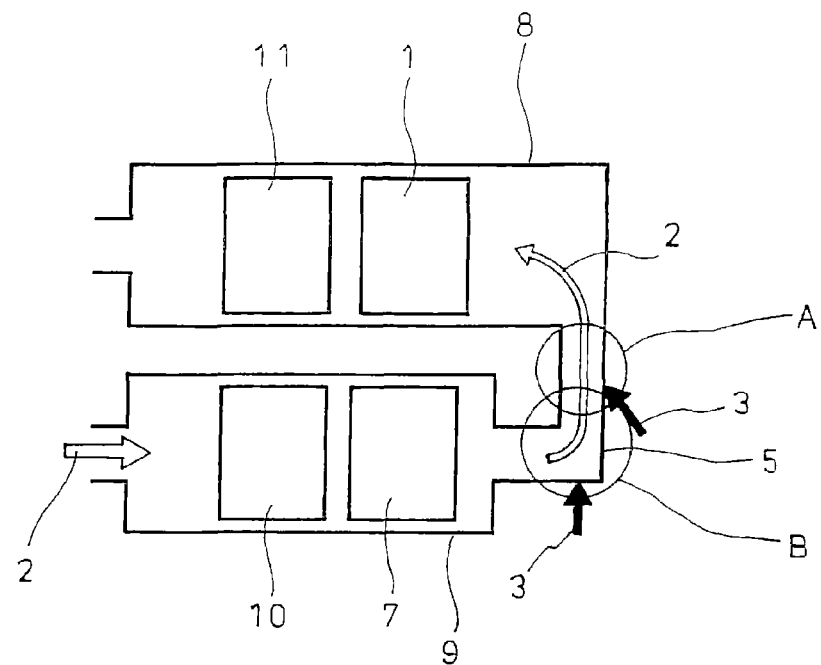
FIG. 6 is a schematic view showing an example of U-shaped exhaust emission control device.

Moreover, the layout of the exhaust emission control device with the particulate filter 7 upstream of the selective reduction catalyst 1 may be S-shaped as shown in the above with respect to FIG. 4; alternatively, it may be U-shaped as shown in FIG. 6. When the urea water 3 is to be added at the straight portion A in the exhaust passage 5 in the U-shaped exhaust emission control device shown in FIG. 6, the FIG. 3 structure may be applied; when the urea water 3 is to be added at the corner B of the exhaust passage 5, the FIG. 5 structure may be applied.

Figure 7:
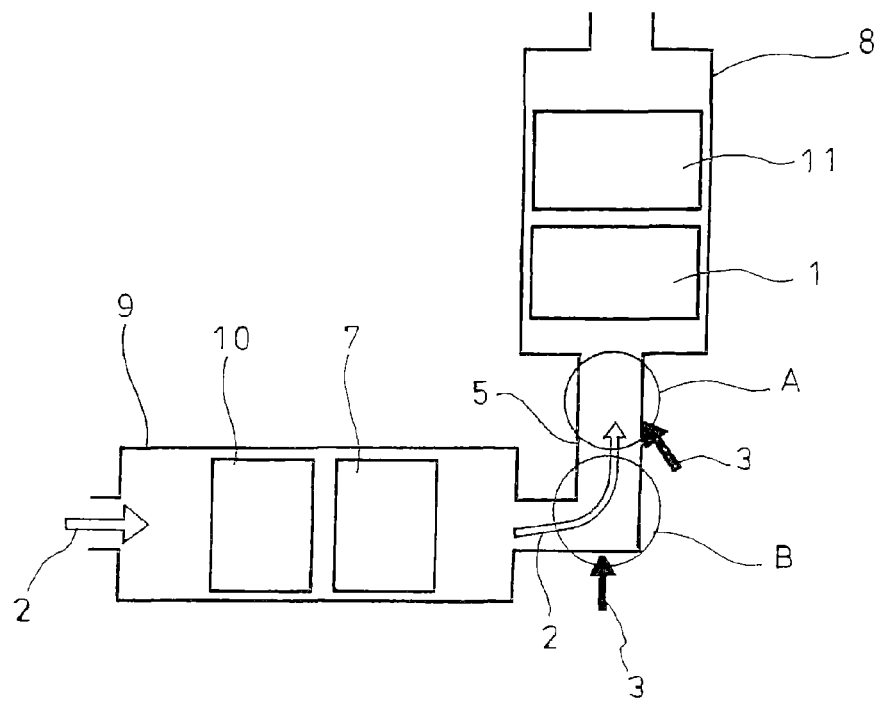
FIG. 7 is a schematic view showing an example of L-shaped exhaust emission control device.

In a case where the layout of the exhaust emission control device with the particulate filter 7 is arranged upstream of the selective reduction catalyst 1 is L-shaped as shown in FIG. 7, the FIG. 3 structure may be applied when the urea water 3 is added at the straight portion A of the exhaust passage 5 in the L-shaped exhaust emission control device shown in FIG. 7, and the FIG. 5 structure may be applied when the urea water 3 is added at the corner B of the exhaust passage 5.

Figure 8:
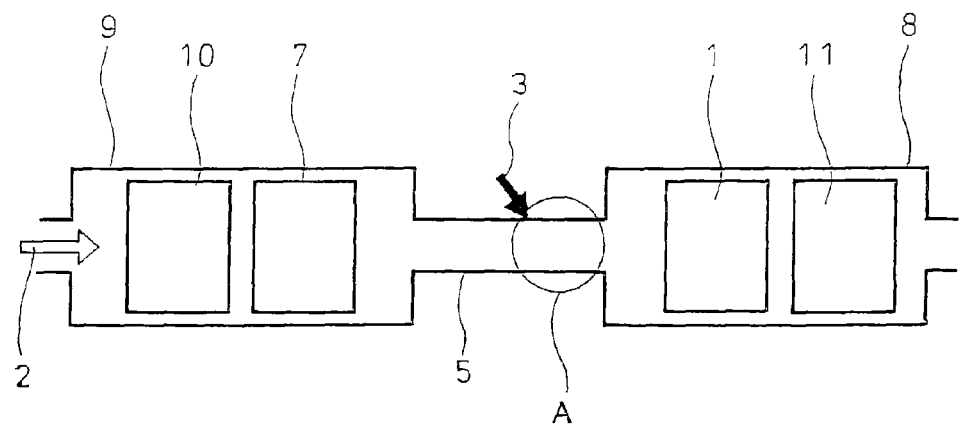
FIG. 8 is a schematic view showing an example of inline exhaust emission control device.

When the layout of the exhaust emission control device with the particulate filter 7 arranged upstream of the selective reduction catalyst 1 is an inline arrangement as shown in FIG. 8, the FIG. 3 structure may be applied to the straight portion A of the exhaust passage 5 in the inline arrangement of the exhaust emission control device shown in FIG. 8.

Figure 9:
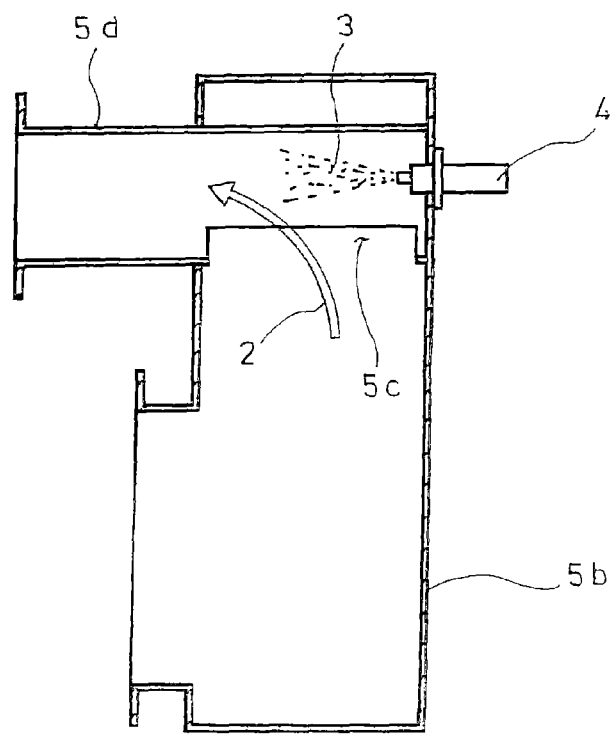
FIG. 9 is a sectional view showing a still further embodiment of the invention.

In the S-shaped exhaust emission control device previously illustrated with respect to FIG. 4, the structure of the exhaust passage 5 at a position where the exhaust gas 2 discharged through the outlet end of the particulate filter 7 is reversely folded back may be constituted by, as shown in FIG. 9, an assembly of a gas gathering chamber 5b which gathers the exhaust gas 2 just discharged from the outlet end of the particulate filter 7 through substantially perpendicular turnabout and an exhaust pipe 5d which extracts the exhaust gas 2 collected in the gas gathering chamber 5b through an opening 5c in a direction reverse to the direction of flow of the exhaust gas through the particulate filter 7, the urea water addition unit 4 being arranged centrally at the inlet end of the exhaust pipe 5d and directed toward the outlet end of the exhaust pipe 5d. In such a case, to constitute the whole of the assembly as divisional piece made of a material having high corrosive resistance would be highly costly; in such a case where the structure cannot be properly divided, only the exhaust pipe 5d adjacent to the added position of the urea water 3 is preliminarily made of the material having higher corrosive resistance to a substance produced by the addition of the urea water 3 than that of a material constituting the gas gathering chamber 5b (a remaining portion of the exhaust passage other than the portion adjacent to the added position of the urea water 3) and is set to the gas gathering chamber 5b for assembling.

Figure 10:
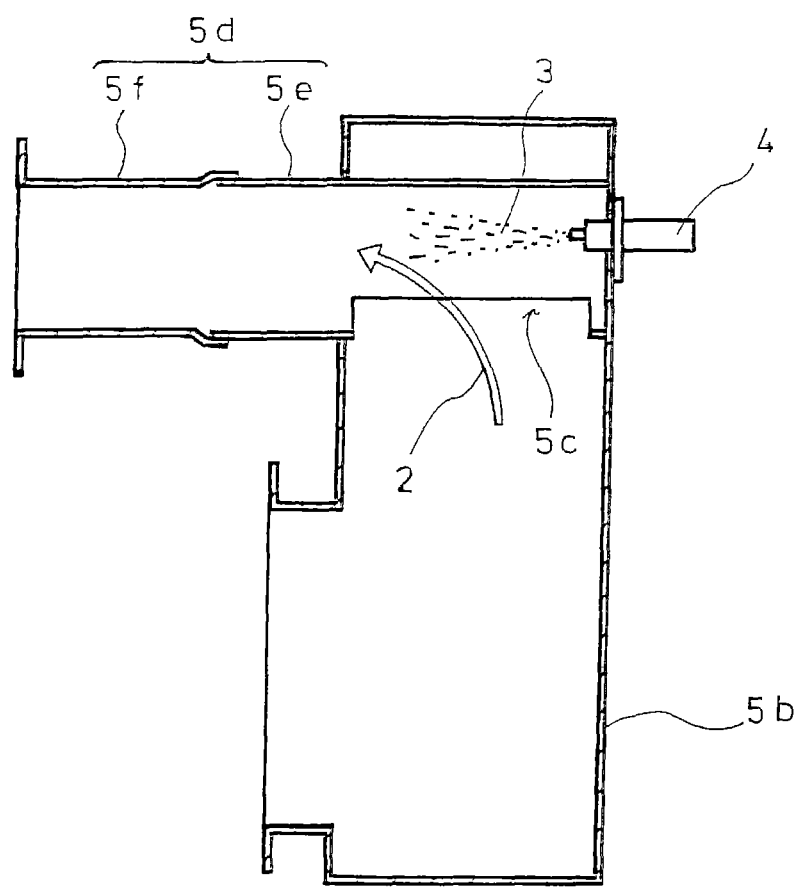
FIG. 10 is a sectional view showing a modification of FIG. 9.

In this case, as shown in FIG. 10, if the exhaust pipe 5d is set long beyond a range of any possible attachment of the urea water 3, only the range of any possible attachment of the urea water 3 may be constituted by a divisional pipe 5e made of a material having high corrosive resistance to which attached in spigot-joining is a pipe extension 5f made of stainless steel with quality similar to the material constituting the gas gathering chamber 5b (a remaining portion of the exhaust passage 5 other than the portion adjacent to the added position of the urea water 3).

It is to be understood that an exhaust emission control device according to the invention is not limited to the above embodiments and that various changes and modifications may be made without departing from the scope of the invention.

REFERENCE SIGNS LIST 1 selective reduction catalyst
2 exhaust gas
3 urea water
4 urea water addition unit (urea water addition means)
5 exhaust passage
5a divisional piece
5e divisional pipe
6 injection port
7 particulate filter

The invention claimed is:
1. An exhaust emission control device, comprising:
a selective reduction catalyst for reacting NOx in an exhaust gas with ammonia,
a particulate filter arranged upstream of the selective reduction catalyst for capturing particulates in the exhaust gas,
an exhaust passage through which the particulate filter communicates with the selective reduction catalyst for guidance of the exhaust gas, and
urea water addition means incorporated in the exhaust passage for adding urea water into the exhaust gas,
wherein
a portion of the aid exhaust passage adjacent to an added position of the urea water is constituted by a divisional piece made of material having higher corrosion resis- tance to a substance resulting from the addition of the urea water than that of a material constituting a remaining portion of the exhaust passage other than the adjacent portion, the divisional piece has front and rear ends inserted inside of upstream- and downstream-side exhaust passage through spigot joining, the divisional piece has a side surface formed with an injection port slantingly divergent upstream, the urea water addition means being fitted to the injection port from outside; and the divisional piece is bent in the form of an elbow suitable for adding the urea water at a corner in the exhaust passage.

2. The exhaust emission control device as claimed in claim 1, wherein the urea water addition means employs an airless injection mode where the urea water is injected under pressure with no assist by air.

3. The exhaust emission control device as claimed in claim 2, wherein the urea water addition means is fitted to the injection port from outside so as to inject urea water downstream.

4. The exhaust emission control device as claimed in claim 1, wherein the urea water addition means is fitted to the injection port from outside so as to inject urea water downstream.

* * * * *